US010360721B2

(12) United States Patent
Lai et al.

(10) Patent No.: US 10,360,721 B2
(45) Date of Patent: Jul. 23, 2019

(54) METHOD AND APPARATUS FOR SIGNALING REGION OF INTERESTS

(71) Applicant: MEDIATEK INC., Hsinchu (TW)

(72) Inventors: Wang Lin Lai, San Jose, CA (US); Shan Liu, San Jose, CA (US)

(73) Assignee: MEDIATEK INC., Hsinchu (TW)

(*) Notice: Subject to any disclaimer, the term of this patent is extended or adjusted under 35 U.S.C. 154(b) by 0 days.

(21) Appl. No.: 15/600,256

(22) Filed: May 19, 2017

(65) Prior Publication Data
US 2017/0345205 A1 Nov. 30, 2017

Related U.S. Application Data

(60) Provisional application No. 62/341,655, filed on May 26, 2016, provisional application No. 62/372,824, (Continued)

(51) Int. Cl.
H04W 4/00 (2018.01)
G06T 15/20 (2011.01)
(Continued)

(52) U.S. Cl.
CPC ............ G06T 15/205 (2013.01); G06T 17/05 (2013.01); H04N 13/117 (2018.05); H04N 13/122 (2018.05); H04N 13/194 (2018.05); H04N 13/221 (2018.05); H04N 13/232 (2018.05); H04N 13/239 (2018.05);
(Continued)

(58) Field of Classification Search
CPC ..... G06T 15/205; G06T 17/05; H04N 13/122; H04N 13/221; H04N 13/232; H04N 13/296
See application file for complete search history.

(56) References Cited

U.S. PATENT DOCUMENTS 6,195,789 B1 * 2/2001 Matsunaga ........... G06T 11/203
345/420
2006/0256113 A1 11/2006 Grover et al.
(Continued)

FOREIGN PATENT DOCUMENTS

| CN | 102074165 A | 5/2011 |
| TW | 201445508 A | 12/2014 |
| TW | 201514865 A | 4/2015 |

OTHER PUBLICATIONS

International Search Report dated Aug. 9, 2017 in PCT/CN2017/086048 filed May 26, 2017.
(Continued)

Primary Examiner — Clemence S Han
(74) Attorney, Agent, or Firm — Oblon, McClelland, Maier & Neustadt, L.L.P.

(57) ABSTRACT

Aspects of the disclosure provide an apparatus that includes an interface circuit, an image generating circuit and a display device. The interface circuit is configured to receive media data with timed directorial information indicative of a region of interests at a time. The image generating circuit is configured to extract the timed directorial information, and generate one or more images of the region of interests based on the media data and the timed directorial information. The display device is configured to display the one or more images at the time.

19 Claims, 7 Drawing Sheets

Related U.S. Application Data filed on Aug. 10, 2016, provisional application No. 62/382,805, filed on Sep. 2, 2016, provisional application No. 62/384,209, filed on Sep. 7, 2016, provisional application No. 62/427,196, filed on Nov. 29, 2016.

(51) Int. Cl.
| | |
|---|---|
| *G06T 17/05* | (2011.01) |
| *H04N 13/296* | (2018.01) |
| *H04N 13/232* | (2018.01) |
| *H04N 13/221* | (2018.01) |
| *H04N 13/122* | (2018.01) |
| *H04N 13/194* | (2018.01) |
| *H04N 13/117* | (2018.01) |
| *H04N 13/239* | (2018.01) |
| *H04N 13/243* | (2018.01) |
| *H04N 13/344* | (2018.01) |
| *H04N 13/383* | (2018.01) |

(52) U.S. Cl.
CPC ......... *H04N 13/296* (2018.05); *H04N 13/243* (2018.05); *H04N 13/344* (2018.05); *H04N 13/383* (2018.05)

(56) References Cited

U.S. PATENT DOCUMENTS

| | | | |
|---|---|---|---|
| 2010/0079590 A1* | 4/2010 | Kuehnle | G06K 9/00798 348/118 |
| 2010/0253778 A1 | 10/2010 | Lee et al. | |
| 2010/0290674 A1 | 11/2010 | Kim | |
| 2010/0299630 A1* | 11/2010 | McCutchen | H04N 7/18 715/803 |
| 2012/0092348 A1* | 4/2012 | McCutchen | G06T 3/00 345/474 |
| 2014/0363044 A1* | 12/2014 | Williams | G06K 7/10722 382/103 |
| 2016/0379064 A1* | 12/2016 | van Beek | G06K 9/00798 382/104 |
| 2017/0208251 A1* | 7/2017 | Shamir | G06T 7/33 |
| 2017/0347026 A1* | 11/2017 | Hannuksela | G09G 5/14 |

OTHER PUBLICATIONS

Combined Taiwanese Office Action and Search Report dated Sep. 19, 2018 in Patent Application No. 106117141 (with English translation of categories of cited documents), citing documents AO and AP therein, 7 pages.

* cited by examiner

```
unsigned int(1)  ROI_viewpoint;            ◄──── 611
   if (ROI_viewpoint)                      ◄──── 612
   {
      unsigned int(1)  ROI_track;          ◄──── 613
      if (ROI_track)                       ◄──── 614
         short    ROI_Track_id;            ◄──── 615
      else                                 ◄──── 616
      {
         short           ROI_vp_yaw;       ◄──── 617
         short           ROI_vp_pitch;     ◄──── 618
         unsigned int(1) ROI_fov;          ◄──── 619
         if (ROI_fov)                      ◄──── 620
         {
            short        ROI_fov_yaw;      ◄──── 621
            short        ROI_fov_pitch;    ◄──── 622
         }
      }
   }
}
```

*FIG. 6*

METHOD AND APPARATUS FOR SIGNALING REGION OF INTERESTS

INCORPORATION BY REFERENCE

This present disclosure claims the benefit of U.S. Provisional Application No. 62/341,655, "Methods and Apparatus of DASH features for Spatial (VR, 360) and Temporal relationships" filed on May 26, 2016, U.S. Provisional Application No. 62/372,824, "Methods and Apparatus of Indications of VR and 360 video Content in File Formats" filed on Aug. 10, 2016, U.S. Provisional Application No. 62/382,805, "Methods and Apparatus of Indications of VR in File Formats" filed on Sep. 2, 2016, U.S. Provisional Application No. 62/384,209, "Methods and Apparatus of VR Region of Interests (ROI) Indications in File Formats and on Rendering Devices" filed on Sep. 7, 2016, and U.S. Provisional Application No. 62/427,196, "Methods and Apparatus of indication VR Region" filed on Nov. 29, 2016, which are incorporated herein by reference in their entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Three-dimensional environments can be rendered to provide special user experience. For example, in a virtual reality application, computer technologies create realistic images, sounds and other sensations that replicate a real environment or create an imaginary setting, thus a user can have a simulated experience of a physical presence in a three-dimensional environment.

SUMMARY

Aspects of the disclosure provide an apparatus that includes an interface circuit, an image generating circuit and a display device. The interface circuit is configured to receive media data with timed directorial information indicative of a region of interests at a time. The image generating circuit is configured to extract the timed directorial information, and generate one or more images of the region of interests based on the media data and the timed directorial information. The display device is configured to display the one or more images at the time.

In an example, the timed directorial information is indicative of a region on a surface of a sphere. In another example, the timed directorial information includes a viewpoint and a flag. For example, when the flag is set to a first value, a horizontal coverage range and a vertical coverage range are included in the timed directorial information; and when the flag is set to a second value, a horizontal coverage range and a vertical coverage range are inferred in the timed directorial information.

According to an aspect of the disclosure, the timed directorial information is indicative of at least one of a projection of the region of interests on a rectangular plane, a region on a surface of a sphere, a camera identification, a track identification and a face identification of a platonic solid.

In an embodiment, the timed directorial information includes a viewpoint to indicate the region of interests. Further, the timed directorial information is indicative of a horizontal coverage range and a vertical coverage range about the viewpoint. In an example, the timed directorial information is indicative of boundaries that are formed by great circles on a sphere. In another example, the timed directorial information is indicative of boundaries that are formed by yaw circles and pitch circles on a sphere.

Aspects of the disclosure provide a method for image rendering. The method includes receiving media data with timed directorial information that is indicative of a region of interests at a time, extracting the timed directorial information from the media data, generating one or more images of the region of interests based on the media data and the timed directorial information and displaying the one or more images at the time.

Aspects of the disclosure provide an apparatus that includes a memory and an image generating circuit. The memory is configured to buffer captured media data. The image generating circuit is configured to determine a region of interests at a time, and encapsulate timed directorial information that is indicative of the region of interests at the time with the media data.

Aspects of the disclosure provide a method for image rendering. The method includes receiving captured media data, determining a region of interests at a time and encapsulating timed directorial information that is indicative of the region of interests at the time with the media data.

BRIEF DESCRIPTION OF THE DRAWINGS

Various embodiments of this disclosure that are proposed as examples will be described in detail with reference to the following figures, wherein like numerals reference like elements; and wherein:

FIG. 6 shows a portion of metadata according to an embodiment of the disclosure.

DETAILED DESCRIPTION OF EMBODIMENTS

Figure 1:
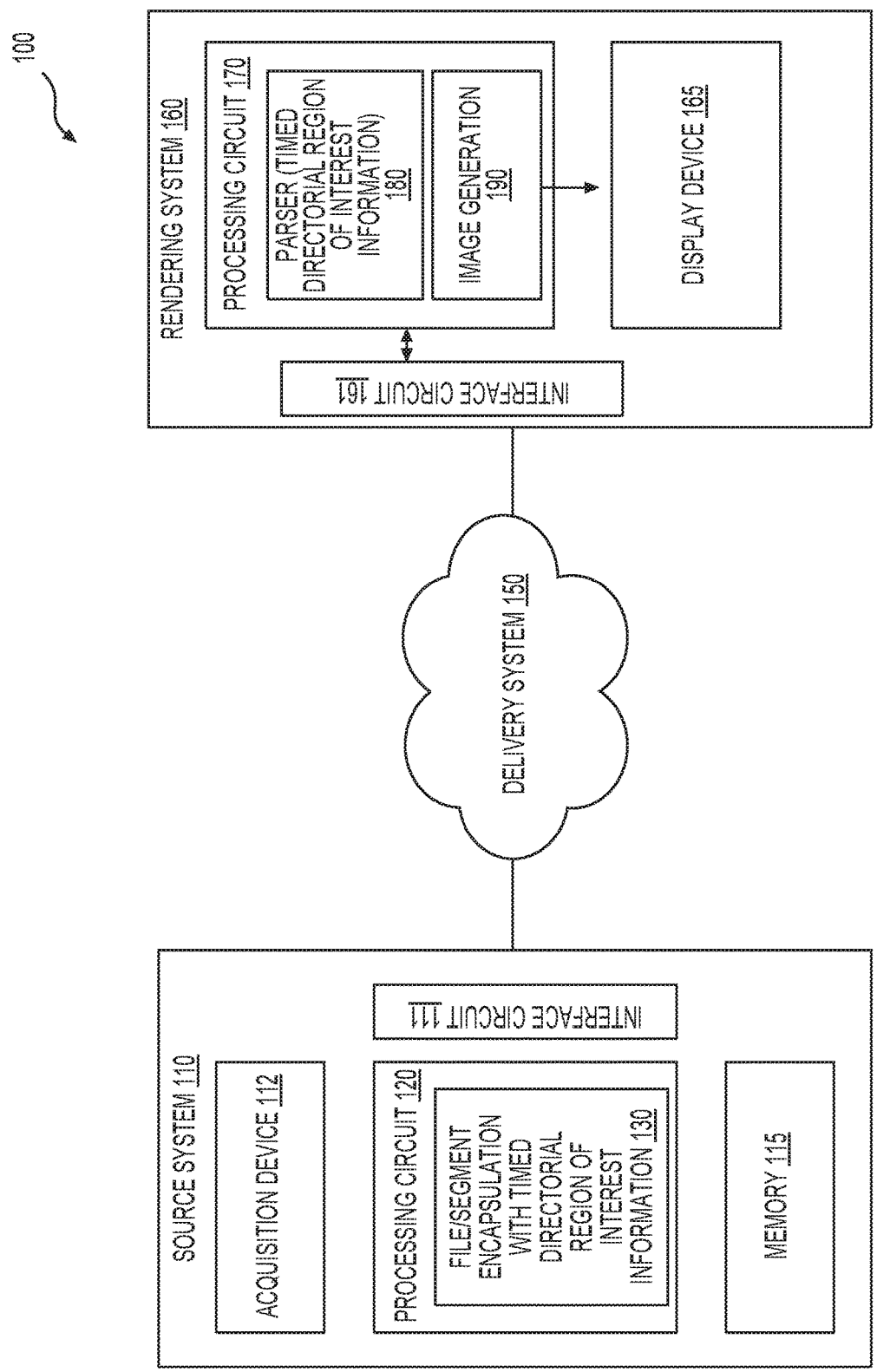
FIG. 1 shows a block diagram of a media system 100 according to an embodiment of the disclosure.

FIG. 1 shows a block diagram of a media system 100 according to an embodiment of the disclosure. The media system 100 includes a source system 110, a delivery system 150 and a rendering system 160 coupled together. The source system 110 is configured to acquire media data for three-dimensional environments and suitably encapsulate the media data. The delivery system 150 is configured to deliver the encapsulated media data from the source system 110 to the rendering system 160. The rendering system 160 is configured to render simulated three-dimensional environments according to the media data. According to an aspect of the disclosure, the source system 110 encapsulates timed directorial information indicative of regions of interests in an environment at time marks, thus the rendering system 160 presents images of the regions of interests at the time marks according to the media data and the timed directorial information.

The source system 110 can be implemented using any suitable technology. In an example, components of the source system 110 are assembled in a device package. In another example, the source system 110 is a distributed system, components of the source system 110 can be arranged at different locations, and are suitable coupled together for example by wire connections and/or wireless connections.

In the FIG. 1 example, the source system 100 includes an acquisition device 112, a processing circuit (e.g., an image generating circuit) 120, a memory 115, and an interface circuit 111 coupled together.

The acquisition device 112 is configured to acquire various media data, such as images, sound, and the like of three-dimensional environments. The acquisition device 112 can have any suitable settings. In an example, the acquisition device 112 includes a camera rig (not shown) with multiple cameras, such as an imaging system with two fisheye cameras, a tetrahedral imaging system with four cameras, a cubic imaging system with six cameras, an octahedral imaging system with eight cameras, an icosahedral imaging system with twenty cameras, and the like, configured to take images of various directions in a surrounding space.

In an embodiment, the images taken by the cameras are overlapping, and can be stitched to provide a larger coverage of the surrounding space than a single camera. In an example, the images taken by the cameras can provide 360° sphere coverage of the whole surrounding space. It is noted that the images taken by the cameras can provide less than 360° sphere coverage of the surrounding space.

The media data acquired by the acquisition device 112 can be suitably stored or buffered, for example in the memory 115. The processing circuit 120 can access the memory 115, process the media data, and encapsulate the media data in suitable format. The encapsulated media data is then suitably stored or buffered, for example in the memory 115.

In an embodiment, the processing circuit 120 includes an audio processing path configured to process audio data, and includes an image/video processing path configured to process image/video data. The processing circuit 120 then encapsulates the audio, image and video data with metadata according to a suitable format.

In an example, on the image/video processing path, the processing circuit 120 can stitch images taken from different cameras together to form a stitched image, such as an omnidirectional image, and the like. Then, the processing circuit 120 can project the omnidirectional image according to suitable two-dimension (2D) plane to convert the omnidirectional image to 2D images that can be encoded using 2D encoding techniques. Then the processing circuit 120 can suitably encode the image and/or a stream of images.

It is noted that the processing circuit 120 can project the omnidirectional image according to any suitable projection technique. In an example, the processing circuit 120 can project the omnidirectional image using equirectangular projection (ERP). The ERP projection projects a sphere surface, such as omnidirectional image, to a rectangular plane, such as a 2D image, in a similar manner as projecting earth surface to a map. In an example, the sphere surface (e.g., earth surface) uses spherical coordinate system of yaw (e.g., longitude) and pitch (e.g., latitude), and the rectangular plane uses XY coordinate system. During the projection, the yaw circles are transformed to the vertical lines and the pitch circles are transformed to the horizontal lines, the yaw circles and the pitch circles are orthogonal in the spherical coordinate system, and the vertical lines and the horizontal lines are orthogonal in the XY coordinate system.

In another example, the processing circuit 120 can project the omnidirectional image to surfaces of platonic solid, such as tetrahedron, cube, octahedron, icosahedron, and the like. The projected surfaces can be respectively rearranged, such as rotated, relocated to form a 2D image. The 2D images are then encoded.

It is noted that, in an embodiment, the processing circuit 120 can encode images taken from the different cameras, and does not perform the stitch operation and/or the projection operation on the images.

It is also noted that the processing circuit 120 can encapsulate the media data using any suitable format. In an example, the media data is encapsulated in a single track. For example, the ERP projection projects a sphere surface to a rectangular plane, and the single track can include a flow of rectangular images of the rectangular plane.

In another example, the media data is encapsulated in multiple tracks. In an example, the ERP projection projects a sphere surface to a rectangular plane, and the rectangular plane is divided into multiple sections. A track can include a flow of images of one or more sections. In another example, a track can include a flow of images from one or more cameras. In another example, a track can include a flow of images of one or more projection faces of a platonic solid.

According to an aspect of the disclosure, the processing circuit 120 is configured to encapsulate timed directorial information indicative of regions of interests in an environment at time marks. In an example, the processing circuit 120 includes a file/segment encapsulation module 130 configured to encapsulate the timed directorial region of interests information in files and/or segments. The timed directorial information can be used to direct a rendering system, such as the rendering system 160, to render images of the regions at the time marks according to the media data and the timed directorial information.

In an embodiment, the processing circuit 120 is configured to provide the timed directorial information in metadata, and encapsulate the metadata with the media data. Specifically, in an example, the processing circuit 120 is configured to provide an initial region of interests in the metadata, and encapsulate the metadata with the media data. Thus, when the rendering system 160 starts to render images, the rendering system 160 starts with an image of the initial region of interests according to the metadata.

In another example, the processing circuit 120 is configured to provide regions of interests at different time in the metadata. In the example, the rendering system 160 includes a display device, such as a television, a smart phone, and the like. According to the regions of interests at the different time, the display device can vary displayed images corresponding to the regions of interests at the different time.

The timed directorial information can use any suitable technique to indicate regions of interests in a 3-dimensional environment. In an example, the timed directorial information specifies viewpoint/viewport to indicate a region of interests. In the example, a viewpoint is a center of a region of interests and indicates a viewing direction, and a viewport includes the viewpoint, and a field of view (FOV) which is the sizes of the region of interests in an example.

In an embodiment, the timed directorial information specifies the viewpoint without specifying the field of view, and the field of view (FOV) can be derived, for example according to a characteristic of a display device. For example, the rendering system 160 includes a head-mounted device (HMD) that has a default field of view.

In another embodiment, the timed directorial information specifies the field of view without specifying the viewpoint, and the viewpoint can be derived, such as a default viewpoint, a center of a 2D image, and the like.

According to an aspect of the disclosure, the regions of interests can be suitably provided in any suitable coordinate system.

Figure 2:
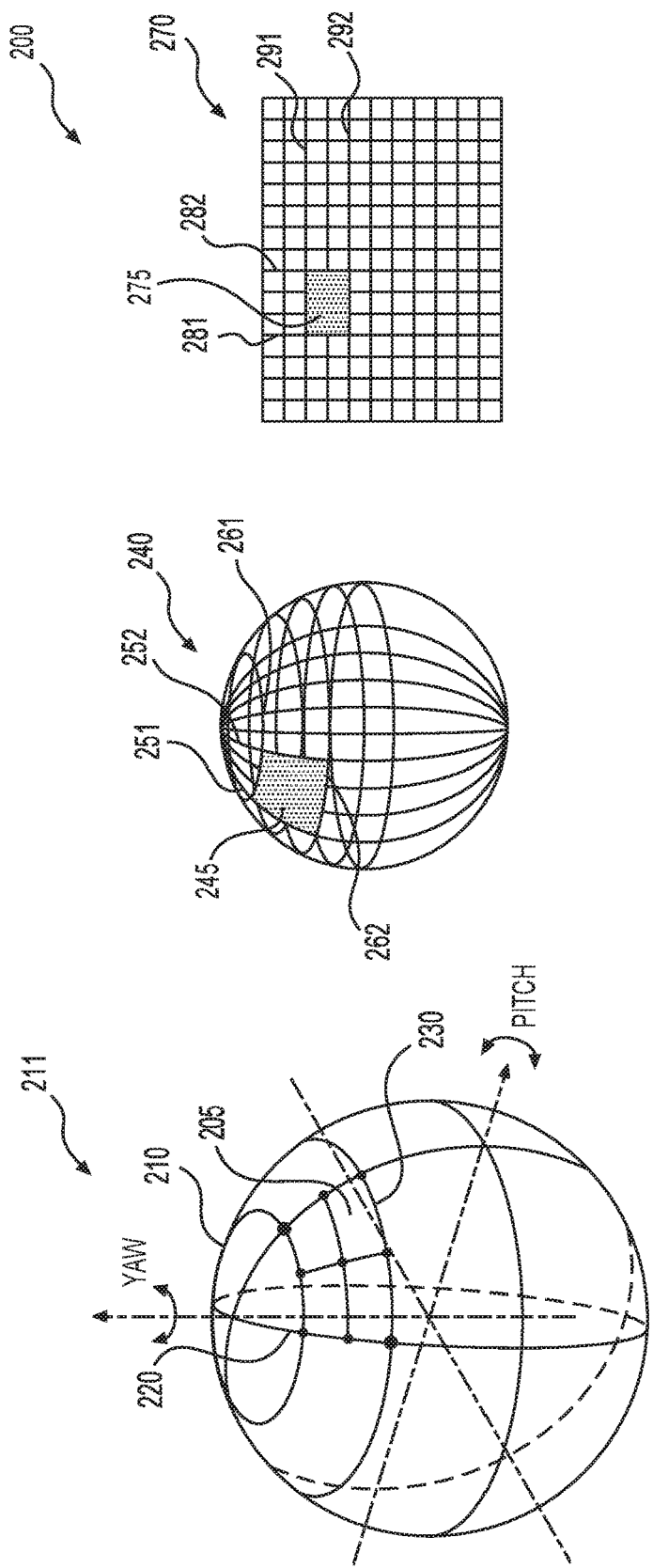
FIG. 2 shows a plot 200 illustrating a region of interests according to an embodiment of the disclosure.

In an embodiment, the regions of interests can be provided in a spherical coordinate system. For example, the viewpoint is provided as a center point in the spherical (geographical) coordinate system, such as a center in yaw direction and a center in pitch direction. In an example, the field of view is provided as a field of view in yaw (coverage in yaw ROI_fov_hor) and a field of view in pitch (coverage in pitch ROI_fov_ver). In another example, the viewport is provided as a minimum yaw value (yaw_min), a maximum yaw value (yaw_max), a minimum pitch value (pitch_min), a maximum pitch value (pitch_max). In this example, the field of view is defined by yaw circles and pitch circles, and the shape of the field of view depends on the location of the viewpoint. An example of region of interests defined by yaw circles and pitch circles is shown in FIG. 2.

Figure 3:
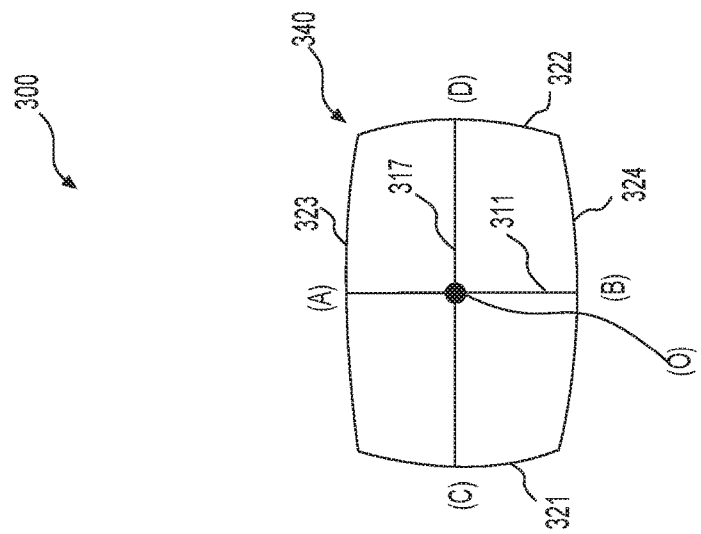
FIG. 3 shows a plot 300 illustrating a region of interests according to an embodiment of the disclosure.
Figure 3:
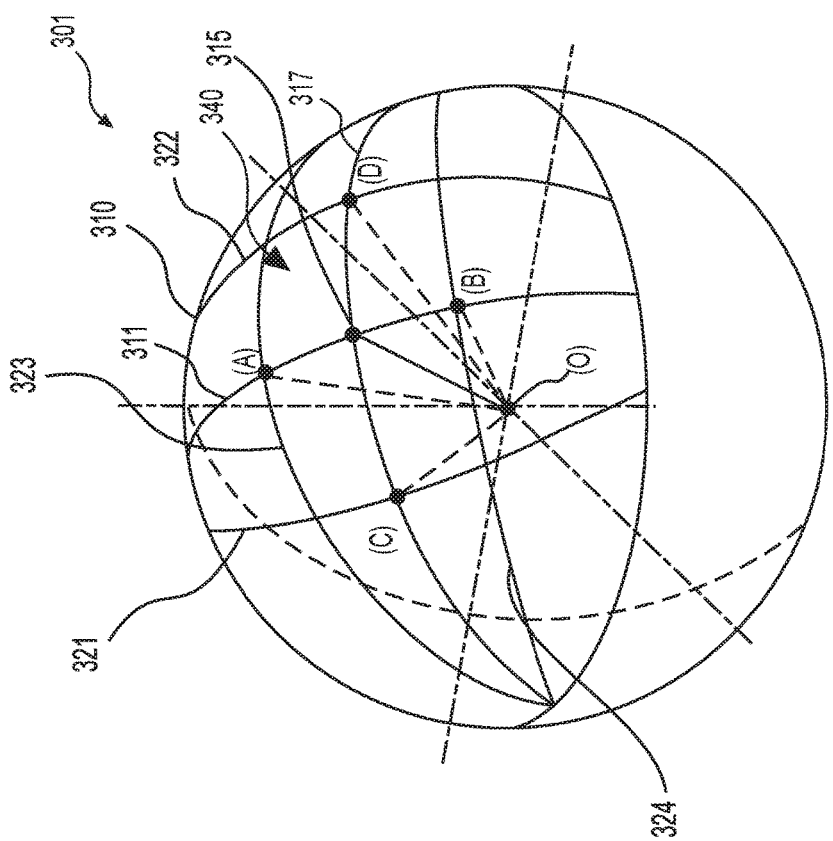

In another example, the field of view includes a first angle in yaw (ROI_fov_yaw) between two great circles, and a second angle (ROI_fov_pitch) in pitch between two great circles. The field of view is defined by the four great circles. In the example, for the same field of view, the shape of the field of view on the sphere surface is the same, and not depends on the viewpoint. An example of region of interests defined by great circles is shown in FIG. 3.

In another embodiment, the region of interests can be provided in a 2-D plane. For example, the viewpoint is provided as (x-coordinate, y-coordinate) in the XY coordinate system. In another example, the viewpoint is provided as a relative position, such as located at a position with a first percentage (of the horizontal length) from a left border of the 2-D plane, and a second percentage (of the vertical height) from a top border of the 2-D plane.

In an example, the field of view can be provided in the 2-D plane. In an example, the field of view is provided as a first number of pixels in the horizontal direction and a second number of pixels in the vertical direction. In another example, the field of view is provided as a first percentage of coverage in the horizontal direction and a second percentage of coverage in the vertical direction.

In an embodiment, the region of interests can be provided by other suitable information, such as an identification of one of multiple cameras in the acquisition device 112, an identification of one of the faces of the platonic solid that is used in the projection, a track identification, and the like. In an example, a track includes a flag that is used to indicate whether the track is a default viewport. In another example, a viewport is provided using a track identification.

In an embodiment, the processing circuit 120 is implemented using one or more processors, and the one or more processors are configured to execute software instructions to perform media data processing. In another embodiment, the processing circuit 120 is implemented using integrated circuits.

In the FIG. 1 example, the encapsulated media data is provided to the delivery system 150 via the interface circuit 111. The delivery system 150 is configured to suitably provide the media data to client devices, such as the rendering system 160. In an embodiment, the delivery system 150 includes servers, storage devices, network devices and the like. The components of the delivery system 150 are suitably coupled together via wired and/or wireless connections. The delivery system 150 is suitably coupled with the source system 110 and the rendering system 160 via wired and/or wireless connections.

The rendering system 160 can be implemented using any suitable technology. In an example, components of the rendering system 160 are assembled in a device package. In another example, the rendering system 160 is a distributed system, components of the source system 110 can be located at different locations, and are suitable coupled together by wire connections and/or wireless connections.

In the FIG. 1 example, the rendering system 160 includes an interface circuit 161, a processing circuit 170 and a display device 165 coupled together. The interface circuit 161 is configured to suitably receive a data stream corresponding to encapsulated media data via any suitable communication protocol.

The processing circuit 170 is configured to process the media data and generate images for the display device 165 to present to one or more users. The display device 165 can be any suitable display, such as a television, a smart phone, a wearable display, a head-mounted device, and the like.

According to an aspect of the disclosure, the processing circuit 170 is configured to extract timed directorial information from the encapsulated media data. The timed directorial information is indicative of a region of interests with time for a simulated environment in an example. Then, the processing circuit 170 is configured to generate one or more images of region at the time based on the media data and the timed directorial information. In an embodiment, the processing circuit 170 is configured to request suitable media data, such as a specific track, a media data for a section of a rectangular plane, media data from a specific camera, and the like from the delivery system 150 via the interface circuit 161.

In an embodiment, the processing circuit 170 is configured to extract the timed directorial information from metadata. In an example, the processing circuit 170 is configured to de-capsulate the media data, parse the metadata, and extract the timed directorial information from the metadata. The processing circuit 170 is also configured to decode media data. Based on the decoded media data and the metadata, the processing circuit 170 generates images to present to the one or more users.

In an example, the processing circuit 170 is configured to parse the metadata to extract the timed directorial information that is indicative of an initial region of interests. Then, the processing circuit 170 is configured to generate images of the initial region of interests, and provide the images to the display device 165 to present the images to one or more users to start with.

In another example, the processing circuit 170 is configured to parse the metadata to extract the timed directorial information that is indicative of regions of interests at different time. The processing circuit 170 then generates images for regions of interests at different time, and provides the images at different time to the display device 165 to present the images to the users at different time.

In another example, the timed directorial information specifies time-varying viewports, such as suggested director viewports for a movie. The processing circuit 170 can extract the time-varying viewports, and then generates images corresponding to the time-varying viewports. In the example, the display device 165 can play a movie of suggested director viewports according to the timed directorial information.

In an example, the processing circuit 170 includes a parser module 180 and an image generation module 190. The parser module 180 is configured to parse the metadata to extract the timed directorial information that is indicative of the region of interests. The image generation module 190 is configured to generate images of the region of interests. The parser module 180 and the image generation module 190 can be implemented as processors executing software instructions and can be implemented as integrated circuits.

In an embodiment, the timed directorial information specifies a viewpoint, such as a center point in yaw and pitch, without specifying a field of view. The processing circuit 170 can determine the field of view, for example according to a characteristic of the display device 165. Then, the processing circuit 170 generates images according to the viewpoint and the determined field of view.

In an embodiment, the region of interests is provided as an identification of one of the multiple cameras used to acquire images. Then, the processing circuit 170 extracts the identification of the camera, requests and decodes the images taken by the camera for example. In another embodiment, the region of interests is provided as an identification of a face of the platonic solid used in projection. Then, the processing circuit 170 extracts the identification of the face, requests and decodes the images projected to the face of the platonic solid. In another embodiment, the region of interests is provided as an identification of a track among a plurality of tracks. Then, the processing circuit 170 extracts the identification of the track, requests the track of media data and decodes the media data of the track.

In an embodiment, the processing circuit 170 is implemented using one or more processors, and the one or more processors are configured to execute software instructions to perform media data processing. In another embodiment, the processing circuit 170 is implemented using integrated circuits.

FIG. 2 shows a plot 200 illustrating a region of interests according to an embodiment of the disclosure. The plot 200 shows a sphere 211 with a sphere surface 210. The sphere surface 210 (e.g., earth surface) uses spherical coordinate system of yaw (e.g., longitude direction) and pitch (e.g., latitude direction). In the FIG. 2 example, boundaries of a region 205 on the sphere surface 210 are formed by yaw circles 220 (e.g., longitude lines) and pitch circles 230 (e.g., latitude lines).

Further, FIG. 2 shows an ERP projection from a sphere surface 240 to a rectangular plane 270. In the example, the sphere surface 240 uses a spherical coordinate system of yaw and pitch. In the example, the sphere surface 240 is referenced with yaw circles (e.g., yaw circle 251, yaw circle 252), and pitch circles (e.g., pitch circle 261, pitch circle 262). The rectangular plane 270 uses XY coordinate system, and is referenced with vertical lines and horizontal lines.

The ERP projection projects a sphere surface to a rectangular plane in a similar manner as projecting earth surface to a map. During the projection, the yaw circles are transformed to the vertical lines and the pitch circles are transformed to the horizontal lines, the yaw circles and the pitch circles are orthogonal in the spherical coordinate system, and the vertical lines and the horizontal lines are orthogonal in the XY coordinate system.

In the FIG. 2 example, a region of interests 245 on the sphere surface 240 is projected to a region of interests 275 on the rectangular plane 270. In the FIG. 2 example, the boundaries of the region of interests 245 on the sphere surface 240 are the yaw circles 251-252 and the pitch circles 261-262. The yaw circles 251-252 are projected to the rectangular plane 270 as the vertical lines 281-282, and the pitch circles 261-262 are projected to the rectangular plane 270 as the horizontal lines 291-292.

FIG. 3 shows a plot 300 illustrating a region of interests according to an embodiment of the disclosure. In the FIG. 3 example, a sphere 301 has a sphere center (O) and a sphere surface 310. Regions on the sphere surface 310 are defined using great circles. For example, boundaries of a region of interests 340 on the sphere surface 310 are defined by great circles.

In the FIG. 3 example, a viewpoint 315 is located on the sphere surface 310. The viewpoint 315 is on a first great circle 311 that is a yaw circle in an example. Further, a second great circle 317 can be determined, and the second great circle 317 is orthogonal to the first great circle 311 at the viewpoint 315.

In an example, the field of view is provided by two angles, such as a first angle in yaw and a second angle in pitch. In the FIG. 3 example, on the first great circle 311 with the viewpoint 315 being the middle point, two points A and B are determined based on the second angle in the pitch rotation direction with the angle ∠AOB being the second angle. Similarly, on the second great circle 317 with the viewpoint 315 being the middle point, two points C and D are determined based on the first angle in the yaw rotation direction with the angle ∠COD being the first angle.

Further, based on the point C, a third great circle 321 that is orthogonal to the second great circle 317 at the point C can be determined. Based on the point D, a fourth great circle 322 that is orthogonal to the second great circle 317 at the point D can be determined.

Similarly, based on the point A, a fifth great circle 323 that is orthogonal to the first great circle 311 at the point A can be determined. Based on the point B, a six great circle 324 that is orthogonal to the first great circle 311 at the point B can be determined. The great circles 321-324 are the boundaries for the region of interests 340.

In the FIG. 3 example, for the same field of view, the shape of the region of interests on the sphere surface is the same, and not depends on the viewpoint.

Figure 4:
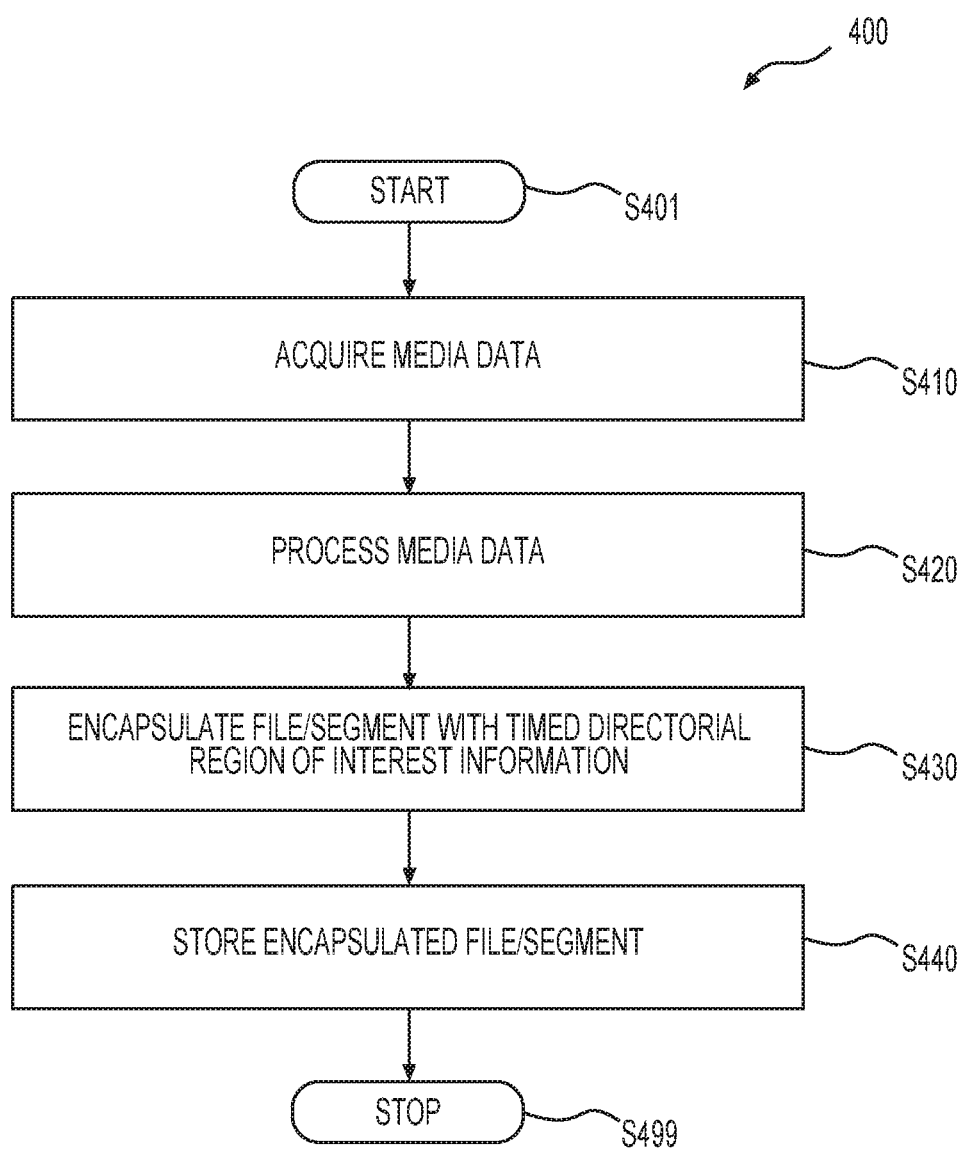
FIG. 4 shows a flow chart outlining a process example 400 according to an embodiment of the disclosure.

FIG. 4 shows a flow chart outlining a process example 400 according to an embodiment of the disclosure. In an example, the process 400 is executed by a source system, such as the source system 110 in the FIG. 1 example. The process starts at S401 and proceeds to S410.

At S410, media data is acquired. In the FIG. 1 example, the acquisition device 112 acquires various media data, such as images, sound, and the like for three-dimensional environments. In an example, the acquisition device 112 includes multiple cameras configured to take images of different directions in a surrounding space. In an example, the images taken by the cameras can provide 360° sphere coverage of the whole surrounding space. It is noted that the images taken by the cameras can provide less than 360° sphere coverage of the surrounding space. The media data acquired by the acquisition device 112 can be suitably stored or buffered, for example in the memory 115.

At S420, the media data is processed. In the FIG. 1 example, the processing circuit 120 includes an audio processing path configured to process audio data, and includes an image/video process path configured to process image/video data. In an example, on the image/video processing path, the processing circuit 120 can stitch images taken from different cameras together to form a stitched image, such as an omnidirectional image, and the like. Then, the processing circuit 120 can project the stitched image according to suitable 2D plane to convert the omnidirectional image to one or more 2D images that can be encoded using 2D encoding techniques. Then the processing circuit 120 can suitably encode the image or a stream of images.

At S430, timed directorial region of interests information is encapsulated with media data in files/segments. In the FIG. 1 example, the processing circuit 120 is configured to encapsulate timed directorial information indicative of regions in an environment at different time marks. In an example, the processing circuit 120 is configured to provide an initial region of interests in the metadata, and encapsulate the metadata with the media data. In another example, the processing circuit 120 is configured to provide time-varying viewports in the metadata.

At S440, encapsulated files/segments are stored and delivered. In the FIG. 1 example, the encapsulated media data can be stored in the memory 115, and can be provided to the delivery system 150 via the interface circuit 111. The delivery system 150 can suitably deliver the media data to clients, such as the rendering system 160. Then, the process proceeds to S499 and terminates.

Figure 5:
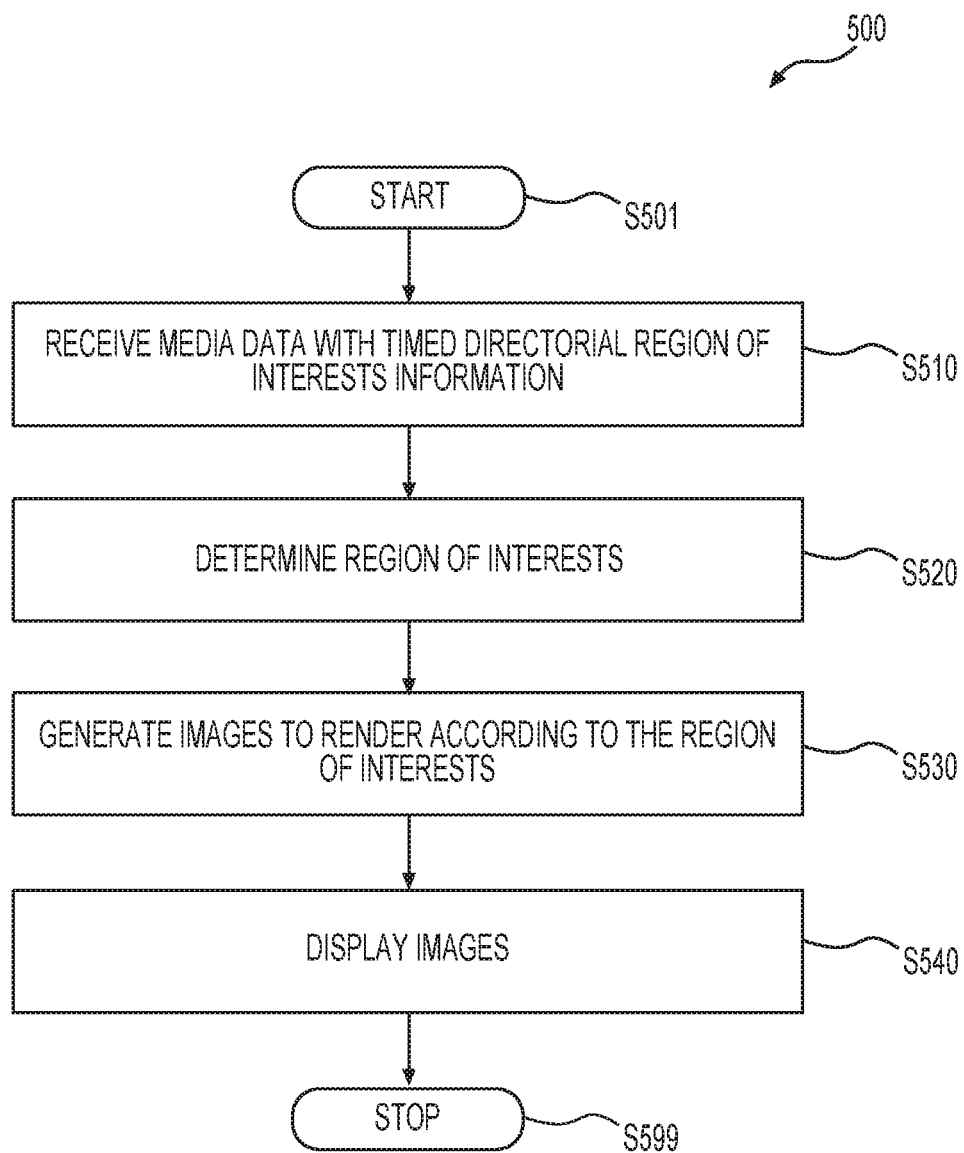
FIG. 5 shows a flow chart outlining a process example 500 according to an embodiment of the disclosure.

FIG. 5 shows a flow chart outlining a process example 500 according to an embodiment of the disclosure. In an example, the process 500 is executed by a rendering system, such as the rendering system 160 in the FIG. 1 example. The process starts at S501 and proceeds to S510.

At S510, media data with timed directorial region of interests information is received. In the FIG. 1 example, the interface circuit 161 in the rendering system 160 suitably receives a data stream corresponding to encapsulated media data via a suitable communication protocol.

At S520, a region of interests is determined from the timed directorial region of interests information. In the FIG. 1 example, the processing circuit 170 can de-capsulate the media data, extract the metadata, and parse the metadata to extract the timed directorial information from metadata. In an example, the timed directorial information specifies a viewpoint without specifying field of view. The processing circuit 170 extracts the viewpoint and determines the field of view, for example according to a characteristic of a head-mounted device. In another example, the timed directorial information specifies both a viewpoint and field of view. Then, the processing circuit 170 extracts both of the viewpoint and the field of view from the metadata. In another example, the processing circuit 170 extracts a face identification, a track identification, or a camera identification that is indicative of the region of interests.

At S530, images to render views for the region of interests are generated. In the FIG. 1 example, the processing circuit 170 is configured to generate one or more images of the region of interests based on the media data and the timed directorial information.

In an embodiment, the processing circuit 170 is configured to request suitable media data, such as a specific track of media data, media data for section of rectangular plane, media data from a specific camera, and the like from the delivery system 150.

At S540, images are displayed. In the FIG. 1 example, the display device 165 suitably presents the images to one or more users. Then, the process proceeds to S599 and terminates.

FIG. 6 shows an example of a portion 600 of metadata according to an embodiment of the disclosure. The portion 600 of metadata is used to indicate a region of interests. In an example, the processing circuit 120 encapsulates the portion 600 of metadata and other portions of metadata with media data. In another example, the processing circuit 170 parses the portion 600 of metadata to extract the region of interests.

At line 611, a parameter ROI_viewpoint is defined to indicate whether viewpoint is provided.

At line 612, when the parameter ROI_viewpoint is binary 1, a viewpoint of the region of interest is provided in the metadata.

At line 613, a parameter ROI_track is defined to indicate whether a track identification is provided.

At line 614, when the parameter ROI_track is binary 1, the region of interests is provided using a track identification.

At line 615, a parameter ROI_Track_id is defined for the track identification.

At line 616, when the parameter ROI_track is binary 0, the region of interests is provided in a format that includes a viewpoint.

At lines 617-618, a parameter ROI_vp_yaw is defined for the yaw of the viewpoint, and a parameter ROI_vp_pitch is defined for the pitch of the viewpoint.

At line 619, a parameter ROI_fov is defined to indicate whether a field of view is provided.

At line 620, when the parameter ROI_fov is binary 1, the region of interests is provided with a field of view.

At lines 621-622, a parameter ROI_fov_yaw is defined for a first angle between two great circles in yaw, and a parameter ROI_fov_pitch is defined for a second angle between two great circles in pitch.

It is noted that the portion 600 can be suitably modified to use other suitable format to indicate region of interests. In an example, parameters ROI_hov and ROI_ver can be defined for yaw circles and pitch circles.

Figure 7:
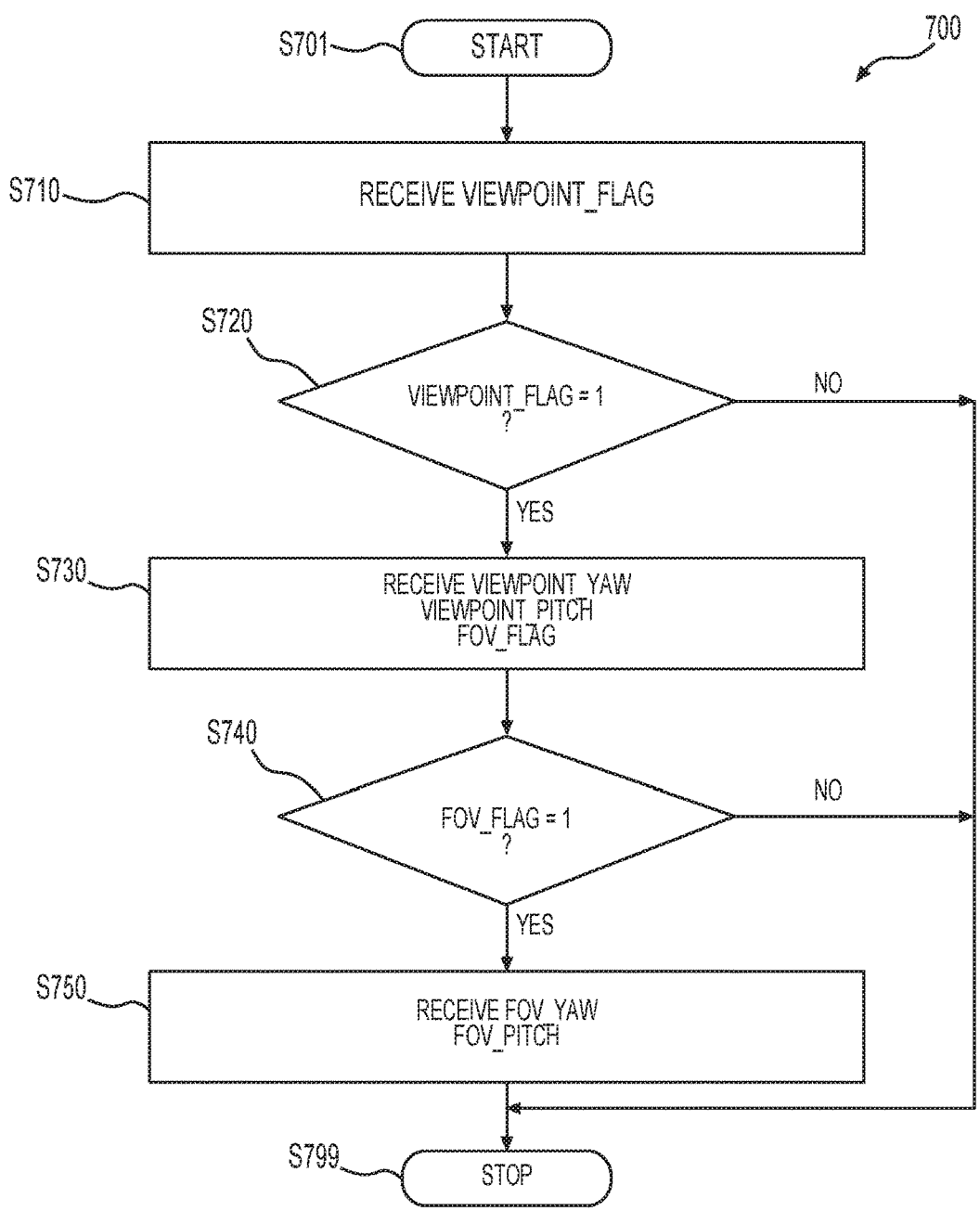
FIG. 7 shows a flow chart outlining a process example 700 according to an embodiment of the disclosure.

FIG. 7 shows a flow chart outlining a process example 700 according to an embodiment of the disclosure. In an example, the process 700 is executed by a rendering system, such as the rendering system 160 in the FIG. 1 example. The process starts at S701 and proceeds to S710.

At S710, a first flag (e.g., VIEWPOINT FLAG) is received from metadata. The first flag indicates whether a viewpoint is provided. In an example, when the first flag has a first value (e.g., binary "1"), the first flag indicates that the viewpoint is provided; and when the first flag has a second value (e.g., binary "0"), the first flag indicates that the viewpoint is not provided.

At S720, when the first flag indicates that the viewpoint is provided (e.g., the first flag equals binary "1"), the process proceeds to S730; otherwise, the process proceeds to S799 and terminates.

At S730, a viewpoint of the region of interest is received from the metadata. In an example, the viewpoint is provided in the form of a yaw value (VIEWPOINT_YAW) and a pitch value (VIEWPOINT_PITCH). In addition, a second flag (e.g., FOV_FLAG) is received from the metadata. The second flag indicates whether a field of view is provided. In an example, when the second flag has a first value (e.g., binary "1"), the second flag indicates that the field of view is provided; and when the second flag has a second value (e.g., binary "0"), the second flag indicates that the field of view is not provided.

At S740, when the second flag indicates that the field of view is provided (e.g., the second flag equals binary "1"), the process proceeds to S750; otherwise, the process proceeds to S799 and terminates.

At S750, a field of view is received from the metadata. The field of view can be provided in any suitable form. In an example, the field of view is provided in the form of a range of yaw values (FOV_YAW) and a range of pitch values (FOV_PITCH). The process proceeds to S799 and terminates.

It is noted that in an aspect of the disclosure, the timed directorial information is indicative of a region on a surface of a sphere. In another aspect of the disclosure, the timed directorial information includes a viewpoint and a flag. For example, when the flag is set to a first value, a horizontal coverage range and a vertical coverage range are included in the timed directorial information; and when the flag is set to a second value, a horizontal coverage range and a vertical coverage range are inferred in the timed directorial information.

When implemented in hardware, the hardware may comprise one or more of discrete components, an integrated circuit, an application-specific integrated circuit (ASIC), etc.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. An apparatus, comprising:
an interface circuit configured to receive media data with timed directorial information indicative of a region of interests at a time;
an image generating circuit configured to extract the timed directorial information, and generate one or more images of the region of interests based on the media data and the timed directorial information; and
a display device configured to display the one or more images at the time.

2. The apparatus of claim 1, wherein the timed directorial information is indicative of at least one of:
a projection of the region of interests on a rectangular plane;
a region on a surface of a sphere;
a camera identification;
a track identification; and
a face identification.

3. The apparatus of claim 1, wherein the timed directorial information includes a viewpoint to indicate the region of interests.

4. The apparatus of claim 3, wherein the timed directorial information is indicative of a horizontal coverage range and a vertical coverage range about the viewpoint.

5. The apparatus of claim 4, wherein the timed directorial information is indicative of boundaries that are formed by great circles.

6. The apparatus of claim 4, wherein the timed directorial information is indicative of boundaries that are formed by yaw circles and pitch circles.

7. A method for image rendering, comprising:
receiving media data with timed directorial information that is indicative of a region of interests at a time;
extracting the timed directorial information from the media data;
generating one or more images of the region of interests based on the media data and the timed directorial information; and
displaying the one or more images at the time.

8. The method of claim 7, wherein receiving the media data with the timed directorial information that is indicative of the region of interests at the time comprises at least one of:
receiving the timed directorial information that is indicative of a projection of the region of interests on a rectangular plane;
receiving the timed directorial information that is indicative of a region on a surface of a sphere;
receiving the timed directorial information that is indicative of a camera identification;
receiving the timed directorial information that is indicative of a track identification; and
receiving the timed directorial information that is indicative of a face identification.

9. The method of claim 7, wherein receiving the media data with the timed directorial information that is indicative of the region of interests at the time further comprises:
receiving the timed directorial information that includes a viewpoint to indicate the region of interests.

10. The method of claim 9, further comprising:
receiving the timed directorial information that is indicative of a horizontal coverage range and a vertical coverage range about the viewpoint.

11. The method of claim 10, further comprising:
receiving the timed directorial information that is indicative of boundaries that are formed by great circles.

12. The method of claim 10, further comprising:
receiving the timed directorial information is indicative of boundaries that are formed by yaw circles and pitch circles.

13. An apparatus, comprising:
a memory configured to buffer captured media data; and
an image generating circuit configured to determine a region of interests at a time, and encapsulate timed directorial information that is indicative of the region of interests at the time with the media data.

14. The apparatus of claim 13, wherein the timed directorial information is indicative of at least one of:
a projection of the region of interests on a rectangular plane;
a region on a surface of a sphere;
a camera identification;
a track identification; and
a face identification.

15. The apparatus of claim 13, wherein the timed directorial information includes a viewpoint to indicate the region of interests.

16. The apparatus of claim 15, wherein the timed directorial information is indicative of a horizontal coverage range and a vertical coverage range about the viewpoint.

17. The apparatus of claim 16, wherein the timed directorial information is indicative of boundaries that are formed by great circles.

18. The apparatus of claim 16, wherein the timed directorial information is indicative of boundaries that are formed by yaw circles and pitch circles.

19. A method for image rendering, comprising:
receiving captured media data;
determining a region of interests at a time; and
encapsulating timed directorial information that is indicative of the region of interests at the time with the media data.

* * * * *